(12) United States Patent
Yun et al.

(10) Patent No.: US 11,656,897 B2
(45) Date of Patent: May 23, 2023

(54) APPARATUS AND METHOD FOR NETWORK FUNCTION VIRTUALIZATION IN WIRELESS COMMUNICATION SYSTEM

(71) Applicant: Samsung Electronics Co., Ltd., Suwon-si (KR)

(72) Inventors: Ilkook Yun, Suwon-si (KR); Yoontae Kim, Suwon-si (KR); Taehyoung Ahn, Suwon-si (KR); Sangho Wang, Suwon-si (KR); Yeunjin Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/958,482

(22) PCT Filed: Dec. 10, 2018

(86) PCT No.: PCT/KR2018/015592
§ 371 (c)(1),
(2) Date: Jun. 26, 2020

(87) PCT Pub. No.: WO2019/132314
PCT Pub. Date: Jul. 4, 2019

(65) Prior Publication Data
US 2021/0064410 A1 Mar. 4, 2021

(30) Foreign Application Priority Data
Dec. 26, 2017 (KR) .......................... 10-2017-0179623

(51) Int. Cl.
*G06F 9/455* (2018.01)
(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | |
|---|---|---|---|
| 2010/0023952 A1* | 1/2010 | Sandoval | G06F 16/258 |
| | | | 719/318 |
| 2013/0337789 A1* | 12/2013 | Johnson | H04W 40/244 |
| | | | 455/414.1 |

(Continued)

FOREIGN PATENT DOCUMENTS

| | | |
|---|---|---|
| KR | 10-2017-0107531 A | 9/2017 |
| WO | 2016/121802 A1 | 8/2016 |

(Continued)

OTHER PUBLICATIONS

Scheid et al., "Policy-Based Dynamic Service Chaining in Network Functions Virtualization", Jun. 27, 2016, 2016 IEEE Symposium on Computers and Communications (ISCC), IEEE Publishing.*

(Continued)

*Primary Examiner* — Todd L Barker
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An operating method of a device for network function virtualization (NFV) in a communication system includes obtaining a virtual network function descriptor (VNFD), identifying VNF configuration information expressed in a programming language from the VNFD, determining VNF resource information based on the VNF configuration information, and transmitting a VNF generation request message including the VNF resource information.

16 Claims, 8 Drawing Sheets

(56) References Cited

U.S. PATENT DOCUMENTS

| | | | |
|---|---|---|---|
| 2015/0339570 A1* | 11/2015 | Scheffler | G06N 3/04 706/16 |
| 2015/0347102 A1* | 12/2015 | Lattner | G06F 21/577 717/146 |
| 2016/0057102 A1 | 2/2016 | Wei et al. | |
| 2016/0291999 A1* | 10/2016 | Antony | G06F 16/178 |
| 2016/0328259 A1 | 11/2016 | Xia et al. | |
| 2016/0337172 A1 | 11/2016 | Yu et al. | |
| 2018/0004576 A1* | 1/2018 | Gokurakuji | G06F 9/46 |
| 2018/0024852 A1 | 1/2018 | Yabushita et al. | |
| 2018/0115551 A1* | 4/2018 | Cole | H04L 41/18 |
| 2018/0241635 A1* | 8/2018 | Rao | H04L 41/0816 |
| 2018/0260251 A1* | 9/2018 | Beveridge | G06F 9/45558 |
| 2019/0042554 A1* | 2/2019 | Aylett | G06F 40/186 |
| 2019/0065234 A1 | 2/2019 | Zembutsu et al. | |
| 2020/0044919 A1* | 2/2020 | Yao | H04L 41/0893 |
| 2021/0289435 A1* | 9/2021 | Li | H04L 67/10 |

FOREIGN PATENT DOCUMENTS

| | | |
|---|---|---|
| WO | 2017/074461 A1 | 5/2017 |
| WO | 2017/188387 A1 | 11/2017 |

OTHER PUBLICATIONS

Salsano et al., "RDCL 3D, a Model Agnostic Web Framework for the Design and Composition of NFV Services", IEEE NFV-SDN 2017, Third International Workkshop on Orchestration for Software Defeind Infrastructures; Nov. 6, 2017.*

Baldi et al., "Modeling Native Softwae Components as Virtual Network Functions", Aug. 22, 2016, SIGCOMM 2016.*

Allan Kent and David Powers, "PHP Web Development with Macromedia Dreamweaver MX 2004", APress Media, LLC.*

T Nova, "Network Functions As—A-Service over Virtualised Infrastructures", Version 1.0, Sep. 30, 2015.*

Mechtri et al., "ESTO: End-To-End SFC Orchestration Framework", May 2017, IFIP/IEEE Symposium on Integerated Network and Service Management.*

Draxler et al., "SONATA: Service Programming and Orchestration for Virtualized Software Networks", May 19, 2016.*

Hoyos et al., NOn: Network function Virtualization Ontology towards Semantic Service Implementation, Nov. 15, 2016, IEEE.

Extended European Search Report dated Dec. 15, 2020, issued in European Patent Application No. 18896292.2.

ETSI GS NFV-IFA 011, V2. 1.1, Network Functions Virtualisation (NFV), Management and Orchestration, VNF Packaging Specification, Oct. 2016, Sophia Antipolis Cedex—France.

ETSI GS NFV-MAN 001, V1. 1.1, Network Functions Virtualisation (NFV), Management and Orchestration, Dec. 2014, Sophia Antipolis Cedex—France.

ETSI GS NFV-IFA 009, V1.1.1, Network Functions Virtualisation (NFV), Management and Orchestration, Report on Architectural Options, Jul. 2016, Sophia Antipolis Cedex—France.

European Office Action dated Jun. 25, 2021, issued in European Application No. 18896292.2.

European Office Action dated Jun. 15, 2022, issued in European Application No. 18896292.2.

Korean Notice of Final Rejection dated Jun. 20, 2022, issued in Korean Patent Application No. 10-2017-0179623.

Korean Notice of Patent Grant dated Oct. 19, 2022, issued in Korean Patent Application No. 10-2017-0179623.

* cited by examiner

```
vnfd xmlns=urn:ietf:params:xml:ns:yang:nfvc
    vnfd_id
    name
    provider
    description
    descriptor_version
    version
    vendor_configuration
    substitution_mappings
        requirements
        capabilities
    vm_images
        vm_image
    sw_packages
        sw_package
    vnfcs
        vnfc
        vnfc
        vnfc
    connection_points
        connection_point
        connection_point
        connection_point
    internal_virtual_links
        internal_virtual_link
        internal_virtual_link
        internal_virtual_link
    monitoring_params
        monitoring_param
        monitoring_param
        monitoring_param
        monitoring_param
    flavors
        flavor
        flavor
    element_groups
    autoscaling_policies
    config_params
    lifecycle_notifications
    fault_notifications
```

FIG.5

APPARATUS AND METHOD FOR NETWORK FUNCTION VIRTUALIZATION IN WIRELESS COMMUNICATION SYSTEM

TECHNICAL FIELD

The present disclosure generally relates to a wireless communication system, and more specifically, to an apparatus and a method for network function virtualization (NFV) in the wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, network techniques of various schemes are discussed. For example, network function virtualization (NFV) technology has been proposed. The NFV may indicate a technology which provides a virtual network function (VNF) by separating hardware and software components which are components of network and virtualizing network functions. That is, the VNF being the software may run in hardware equipped with a server or a general-purpose processor by virtualizing functions of physical network equipment.

DISCLOSURE OF INVENTION

Technical Problem

Based on the discussions described above, the present disclosure provides an apparatus and a method for network function virtualization (NFV) in a wireless communication system.

Also, the present disclosure provides an apparatus and a method for representing VNF configuration information defined in a virtual network function descriptor (VNFD) using a programming language in a wireless communication system.

Also, the present disclosure provides an apparatus and a method for setting a virtual network function (VNF) using a VNFD written based on a programming language in a wireless communication system.

Also, the present disclosure provides an apparatus and a method for removing dependencies between a VNFD and a VNF and an NFVI infrastructure in a wireless communication system.

Solution to Problem

According to various embodiments of the disclosure, an operating method of a device for network function virtualization (NFV) in a communication system includes obtaining a virtual network function descriptor (VNFD), identifying VNF configuration information expressed in a programming language from the VNFD, determining VNF resource information based on the VNF configuration information, and transmitting a VNF generation request message including the VNF resource information.

According to various embodiments of the disclosure, an apparatus for NFV in a communication system includes a transceiver, and at least one processor functionally coupled with the transceiver. The at least one processor controls to obtain a VNFD, identify VNF configuration information expressed in a programming language from the VNFD, determine VNF resource information based on the VNF configuration information, and transmit a VNF generation request message including the VNF resource information.

Advantageous Effects of Invention

An apparatus and a method according to various embodiments of the present disclosure may ensure flexibility and scalability of network function virtualization (NFV), by representing VNF configuration information defined in a virtual network function descriptor (VNFD) using a programming language and removing dependencies between the VNFD and the VNF and an NFV infrastructure (NFVI).

Effects obtainable from the present disclosure are not limited to the above-mentioned effects, and other effects which are not mentioned may be clearly understood by those skilled in the art of the present disclosure through the following descriptions.

BRIEF DESCRIPTION OF DRAWINGS

FIG. 5 illustrates a layout of a virtual network function descriptor (VNFD) in a wireless communication system according to various embodiments of the present disclosure.

BEST MODE FOR CARRYING OUT THE INVENTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for network function virtualization (NFV) in a wireless communication system. Specifically, the present disclosure explains a technique for removing dependencies between a virtual network function descriptor (VNFD) and an VNF and an NFV infrastructure (NFVI) in the wireless communication system.

Terms indicating signals, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., european telecommunications standards institute (ETSI) IFA011, organization for the advancement of structured information standards (OASIS) topology and orchestration specification for cloud applications (TOSCA)), which are merely exemplary for explanations. Various embodiments of the present disclosure may be easily modified and applied in other communication systems.

Figure 1:
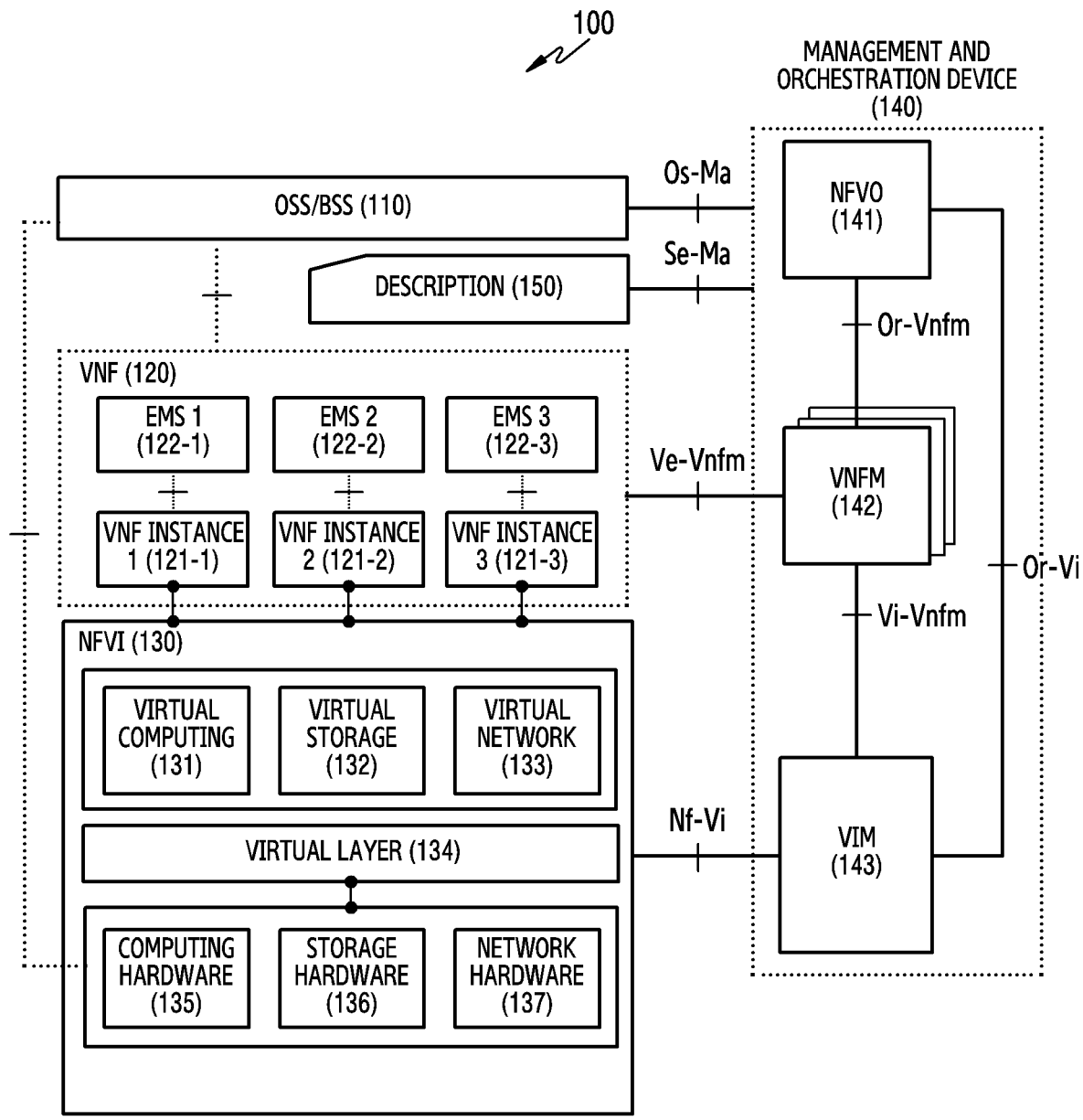
FIG. 1 illustrates a network function virtualization (NFV) architecture in a wireless communication system according to various embodiments of the present disclosure.

FIG. 1 illustrates an NFV architecture in a wireless communication system according to various embodiments of the present disclosure.

Referring to FIG. 1, an NFV architecture 100 may include an operation support system (OSS)/business support system (BSS) 110, a VNF 120, an NFVI 130, an NFV management and orchestration device 140, and a description 150.

The OSS/BSS 110 may manage communications equipment and an NFV environment. For example, the OSS/BSS 110 may support network management of an operator and provision and maintenance of a customer service, or may support billing for customers, customer relationship management, and call center business automation.

The VNF 120 may include VNF instances 121-1, 121-2, and 121-3, and may further include element management systems (EMSs) 122-1, 122-2, and 122-3 corresponding them respectively. In some embodiments, the VNF may be a virtual core network. For example, the VFN may be a virtual mobility management entity (MEE) and a virtual service gateway (S-GW).

The NFVI 130 may include actual physical hardware resources, that is, computing hardware 135, storage hardware 136, and network hardware 137, a virtual layer 134 for virtualizing the actual physical hardware resources, and virtualization resources virtualized by the virtual layer, that is, virtual computing 131, virtual storage 132, and virtual network 133.

The NFV management and orchestration device 140 may include an NFV orchestrator (NFVO) 141, a VNF manager (VNFM) 142, and a virtualized infrastructure manager (VIM) 143. The NFVO 141 may manage the NFV environment. For example, the NFVO 141 manages the VNF 120 using the VNFM 142, and manages the NFVI 130 using the VIM 143. The VNFM 142 manages the VNF 120 deployed in the NFV environment, and communicates with the VIM 143 which manages the NFVI 130 to generate resources for the VNF 120. The VIM 143 manages the NFVI 130, and receives a request for virtual resource generation for the NFVI 130 from the NFVO 141 and the VNFM 142. In some embodiments, the NFV management and orchestration device 140 may obtain service information, VNF information, and infrastructure information from the description 150.

Figure 2:
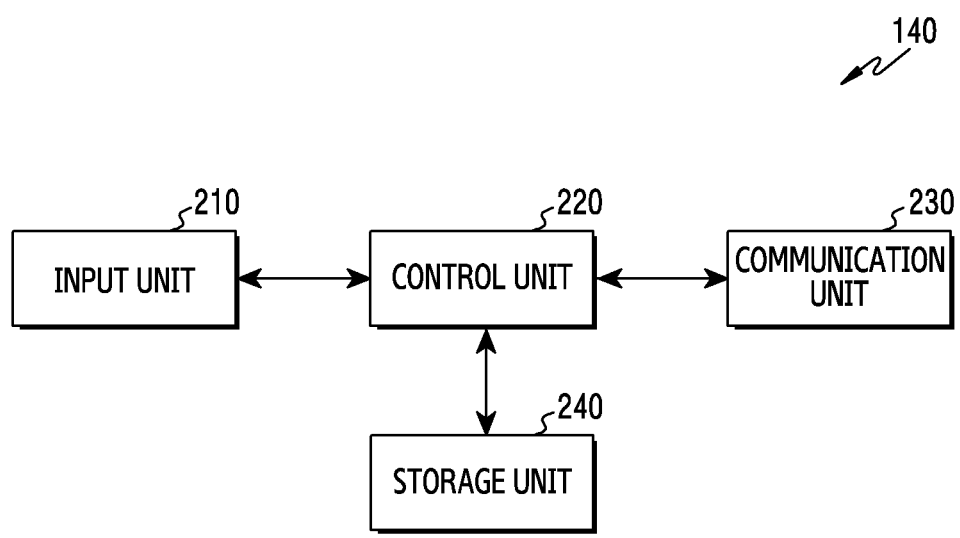
FIG. 2 illustrates a configuration of an NFV management and orchestration device in a wireless communication system according to various embodiments of the present disclosure.

FIG. 2 illustrates a configuration of an NFV management and orchestration device in a wireless communication system according to various embodiments of the present disclosure. The configuration illustrated in FIG. 2 may be understood as the configuration of the NFV management and orchestration device 140. A term such as 'portion' or '~er' used hereafter indicates a unit for processing at least one function or operation, and may be implemented using hardware, software, or a combination of hardware and software.

Referring to FIG. 2, the NFV management and adjustment device 140 includes an input unit 210, a control unit 220, a communication unit 230, and a storage unit 240.

The input unit 210 may receive an input from an external device or a user. For doing so, the input unit 210 may include an input interface. The input received through the input unit 210 may be processed in the control unit 220, and then transmitted to the communication unit 230 and the storage unit 240. In other words, information corresponding to the input received through the input unit 210 may be transmitted to other device through the communication unit 230, or may be stored in the storage unit 240. According to various embodiments, the input unit 210 may include an interface. The input unit 210 may be also referred to as a user interface.

The control unit 220 controls overall operations the NFV management and orchestration device 140. For example, the control unit 220 transmits and receives signals through the communication unit 230. In addition, the control unit 220 records and reads data in and from the storage unit 240. For doing so, the control unit 220 may include at least one processor.

According to various embodiments, the control unit 220 may obtain an VNFD, identify VNF configuration information expressed in a programming language from the VNFD, determine VNF resource information based on the VNF configuration information, and transmit an VNF generation request message including the VNF resource information.

For example, the control unit 220 may control the processing unit 210 to perform operations according to various embodiments described to be described.

The communication unit 230 provides an interface for communicating with other nodes in the network. That is, the communication unit 230 converts a bit string transmitted from the NFV management and orchestration device 140 to other node into a physical signal, and converts a physical signal received from other node into a bit string.

The storage unit 240 stores a basic program for operating the NFV management and orchestration device 140, an application program, and data such as setting information. The storage unit 240 may include a volatile memory, a non-volatile memory, or a combination of a volatile memory and a non-volatile memory. The storage unit 240 provides the stored data at a request of the control unit 340.

Although not depicted in FIG. 2, the NFV management and orchestration device 140 may further include a display. The display may display a screen including an image, graphics, text, and the like. For example, the display may include a liquid crystal, a light emitting diode display or other material. The display may display information corresponding to the input received through the input unit 210, or may display a screen corresponding to the data processed in the control unit 20. In addition, the display may include a touch screen for sensing a user input. In this case, the display may perform the function of the input unit 210, and may receive an input from an external device or the user through the touch screen.

Figure 3:
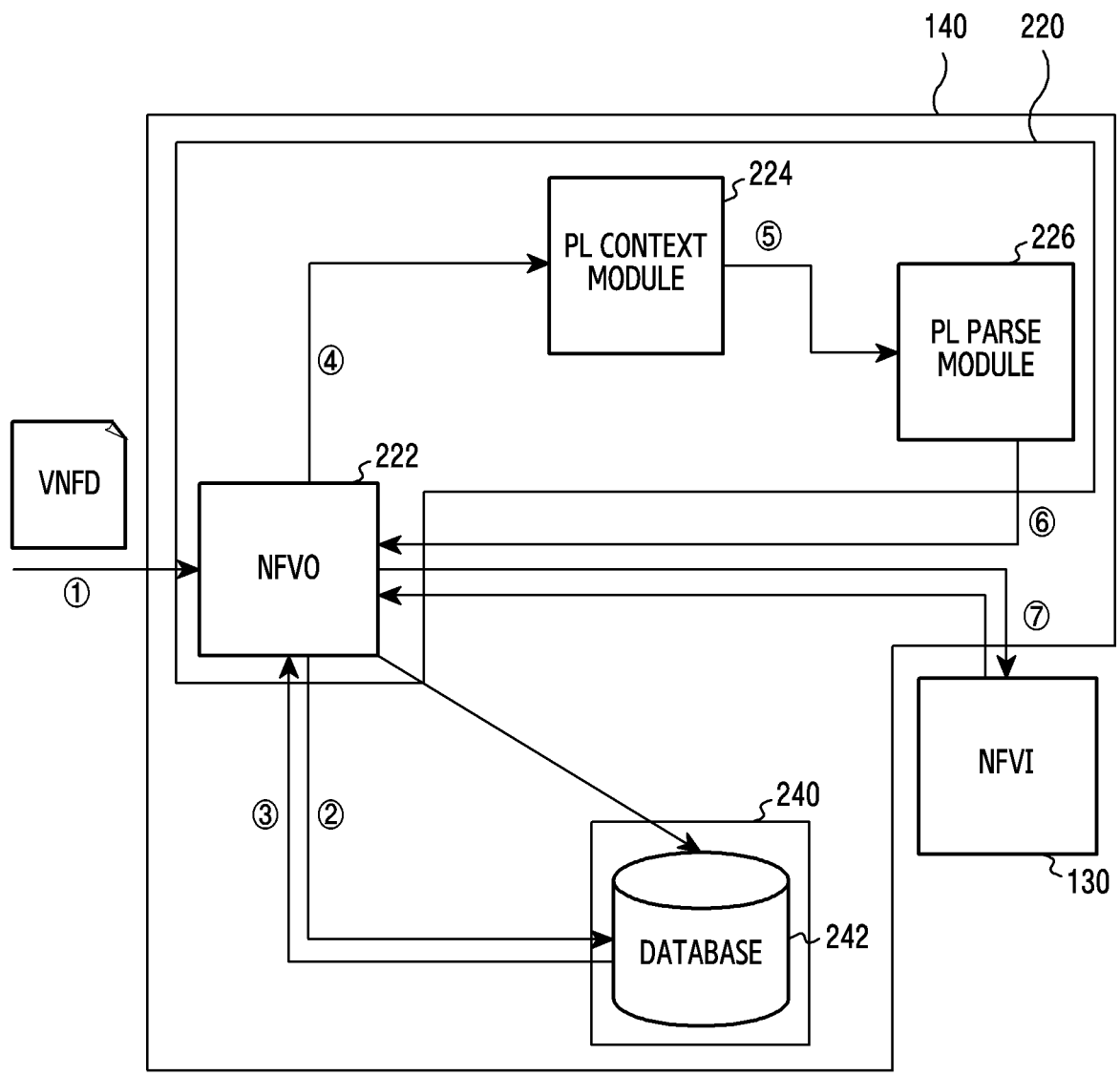
FIG. 3 illustrates interworking between an NFV management and orchestration device and an NFV infrastructure (NFVI) in a wireless communication system according to various embodiments of the present disclosure.

FIG. 3 illustrates interworking between an NFV management and orchestration device and an NFVI in a wireless communication system according to various embodiments of the present disclosure. FIG. 3 illustrates the interworking between the NFV management and orchestration device 140 and the NFVI 130.

Referring to FIG. 3, the control unit 220 of the NFV management and orchestration device 140 may include an NFVO 222, a programming language (PL) context module 224, and a PL parse module 226, and the storage unit 240 may include a database 242. In some embodiments, the NFVO 222 may indicate the NFVO 141 of FIG. 1.

The NFVO 222 may acquire a VNFD to deploy a VNF. Herein, the VNFD is a specification for generating a VNF executed in the NFVI 130, and may include VNF configuration information. In some embodiments, the VNF configuration information defined in the VNFD indicates information required for the VNF deployment, and may include the VNF information and NFVI information.

The NFVO 222 may obtain VNF resource information from the database 242. Herein, the VNF resource information may indicate resource information of the VNF required to deploy the VNF. For example, the VNF resource information may include at least one of network information, subnet information, port information, storage information, and virtual machine (VM) information.

The PL context module 224 may process a PL expression of the VNF configuration information expressed in the programming language and the VNF resource information. That is, the PL context module 224 may process the PL expression of the VNF configuration information and the VNF resource information so that the PL parse module 226 efficiently interprets them.

The PL parse module 226 may generate a result value by applying the processed VNF resource information to the processed PL expression. Herein, the result value may indicate a value indicating a property (e.g., a name, a type, a size) of the VNF resource. The PL parse module 226 may transfer the generated result value to the NFVO 222. The NFVO 222 may transmit a VNF generation request message to the NFVI 130 based on the result value. That is, the NFVO 222 may transmit the VNF generation request message including information relating to the result value. In this case, the NFVI 130 may deploy a VNF corresponding to the property of the VNF resource of the result value.

Figure 4:
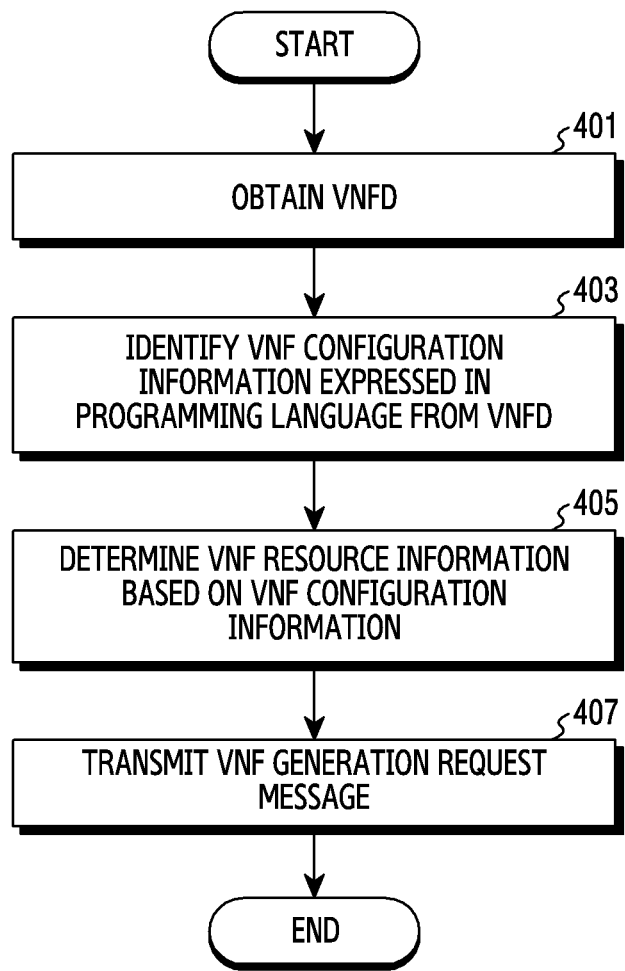
FIG. 4 illustrates a flowchart of an NFV management and orchestration device in a wireless communication system according to various embodiments of the present disclosure.

FIG. 4 illustrates a flowchart of an NFV management and orchestration device in a wireless communication system according to various embodiments of the present disclosure. FIG. 4 illustrates an operating method of the NFV management and orchestration device 140.

Referring to FIG. 4, in step 401, the NFV management and orchestration device 140 obtains a VNFD. In some embodiments, referring to FIG. 5, a layout 500 of the VNFD may include components of the VNFD where VNF configuration information is defined. For example, the layout 500 of the VNFD in an extensible markup language (XML) format may include various components such as vm_images, sw_packages, and connection_points.

In step 403, the NFV management and orchestration device 140 identifies the VNF configuration information expressed in the programming language from the VNFD. Herein, the VNF configuration information may include VNF information defined in the VNFD and NFVI information. In particular, the NFV management and orchestration device 140 may obtain a PL expression of the VNF configuration information expressed in the programming language.

In some embodiments, the PL expression may include a combination of character strings for indicating the property of the VNF resource and an operator (e.g., +) for concatenating the character strings. Thus, the VNF resource information of different types for each vendor may be applied to the PL expression and reflected in the VNFD. For example, a PL expression for the name may include a combination of character strings #vnf.name, "_", #storage.type, "_", #storage.size, and "g" and the operator +.

In step 405, the NFV management and orchestration device 140 determines VNF resource information based on the VNF configuration information. For example, the VNF resource information may indicate information indicating the property of the VNF resource. In some embodiments, the VNF resource information may include a result value generated by applying the VNF resource information to the PL expression of the VNF configuration information.

In step 407, the NFV management and orchestration device 140 transmits a VNF generation request message including the VNF resource information to the NFVI 130. In this case, the VNF resource information may be used for the NFVI 130 to generate a VNF. In some embodiments, the NFV management and orchestration device 140 may transmit to the NFVI 130 the VNF generation request message including information relating to the result value generated by applying the VNF resource information to the PL expression of the VNF configuration information.

According to various embodiments of the present disclosure, if the programming language is applied to the VNFD in an NFV environment, dependencies between the VNFD and the NFVI 130 and the VNF 120 may be eliminated and thus deployment and operation of the VNF may be automated. That is, in the deployment of the VNF, even if the NFVI 130 is changed or the same VNF is deployed several times, the VNFD may not changed and a VNF package including a VM image and the VNFD may not be reconfigured. Thus, by applying the programming language to the VNFD, the VNFD may be configured to be dynamic and programmable and thus flexibility and scalability of the NFV may be guaranteed.

In some embodiments, the operations of FIG. 4 may be performed sequentially, but may not be performed necessarily sequentially. For example, the order of the operations may be changed, and at least two operations may be performed in parallel. Further, in some embodiments, the operations of FIG. 4 may not be necessarily performed all together, and some of the operations may be omitted.

Figure 6:
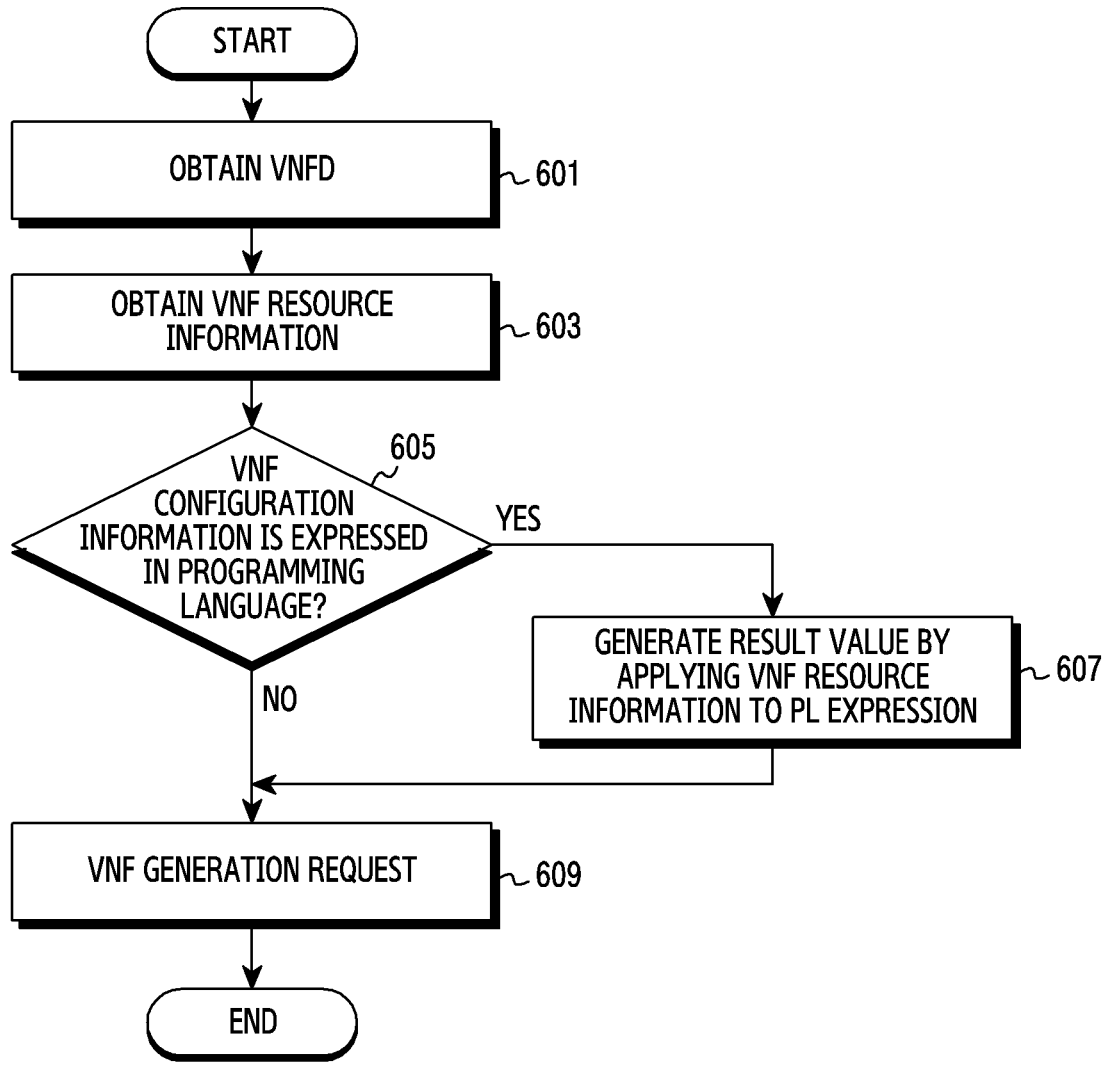
FIG. 6 illustrates another flowchart of an NFV management and orchestration device in a wireless communication system according to various embodiments of the present disclosure.

FIG. 6 illustrates another flowchart of an NFV management and orchestration device in a wireless communication system according to various embodiments of the present disclosure. FIG. 6 illustrates an operating method of the NFV management and orchestration device 140.

Referring to FIG. 6, in step 601, the NFV management and orchestration device 140 obtains a VNFD. Herein, the VNFD may include VNF configuration information. For example, the VNF configuration information may include 1) basic information for distinguishing the VNFD, 2) information relating to a virtual device unit (VDU) constituting the VNF, 3) storage, network interface, and VDU setting information constituting the VDU, 4) virtual link information constituting the VNF, 5) flavor information constituting the VNF, and 6) VDU size and scale information constituting the flavor.

In step 603, the NFV management and orchestration device 140 obtains VNF resource information. Herein, the VNF resource information may include resource information of the VNF required to deploy the VNF.

In step 605, the NFV management and orchestration device 140 determines whether the VNF configuration information is expressed in a programming language. For example, the programming language may include an expression language (EL) which constructs an expression with a character string without restricting a representation format of document. However, in various embodiments of the present disclosure, the programming language is not limited to the EL, and may include various programming languages for expressing the VNF configuration information.

If the VNF configuration information is expressed in the programming language, in step 607, the NFV management and orchestration device 140 generates a result value by applying the VNF resource information to the PL expression of the VNF configuration information. That is, by generating the result value, the NFV management and orchestration device 140 may reflect the VNF resource information dynamically generated and received from the NFVI 130 in the VNFD.

In step 609, the NFV management and orchestration device 140 transmits a VNF generation request message including information of the result value to the NFVI 130. In this case, in response to receiving the VNF generation request message, the NFVI 130 may deploy a VNF corresponding to the result value information. In some embodiments, if the VNF configuration information is expressed in the programming language, the NFV management and orchestration device 140 may transmit a VNF generation request message based on the result value. In this case, a plurality of VNFs may be generated based on one VNFD. In other embodiments, if the VNF configuration information is not expressed in the programming language, the NFV management and orchestration device 140 may transmit the VNF generation request message based on the VNF configuration information defined with a fixed value. In this case, only one VNF may be generated based on one VNFD.

In some embodiments, the operations of FIG. 6 may be performed sequentially, but may not be performed necessarily sequentially. For example, the order of the operations may be changed, and at least two operations may be performed in parallel. Further, in some embodiments, the operations of FIG. 6 may not be necessarily performed all together, and some of the operations may be omitted.

As described with reference to FIG. 6, the VNF configuration information may be expressed in the programming language. The manner in which the VNF configuration information is expressed in the programming language may be defined variously. For example, storage of the VNF configuration information may be expressed in the programming language (e.g., EL) as shown in Table 1.

TABLE 1

VOMA_VM_IMAGE:
    type: tosca.nodes.nfv.VDU.VirtualStorage
    properties:
        id: DISK-001
        name: '#vnf.name + ' '_' ' + #storage.type + ' '_' ' + #storage.size + ' 'g' ' '
        type: vm_image
        type_description: os-boot-operation-disk
size_of_storage: '@java.lang.Math.ceil((#vm_image.size/(1024*1024))'

Referring to Table 1, it may be identified that the EL is applied to 'name' and 'size_of_storage' described in the VNFD. 'name' indicates a name of the storage deployed in the VIM 143, and should have a unique value to distinguish the storage. Hence, if the EL is applied to 'name' and the name of the VNF is inputted as a prefix to 'name', a different storage may be created for each VNF even though several VNFDs are created with one VNFD. In this case #vnf.name of 'name' may indicated the name of the VNF. 'Size_of_storage' indicated a size of the storage, is a size of a local disk to which the VM image is applied in Table 1, and matches the size of the VM image. Values of 'name' and 'size_of_storage' should be changed as the VM image is changes. However, if the EL is applied, the VNFD does not need modification because changing the values of 'name' and 'size_of_storage' is reflected in the VNFD.

TABLE 2

VCSCF_VOMA:
    type: tosca.nodes.nfv.VDU.Compute # tosca predefined node type
    artifacts:
    - sw_image:
      type: tosca.artifacts.nfv.SwImage
      properties:
        id: vm_template.img
        name: '#vm_image.getName'
        version: '#vm_image.substring(#vm_image.lastIndexOf( '_' ) + 1, TABLE 2-continued

```
#vm_image.lastIndexOf( '_' ))'
        checksum:
  '@org.apache.commons.codec.digest.DigestUtils.md5Hex(new
@java.io.FileInputStream(#vm_image.path))'
        size: '#vm_image.size'
```

Referring to Table 2, it may be identified that the EL is applied to 'id', 'name', 'version', 'checksum', and 'size' for the VM image described in the VNFD. That is, by applying the EL, since the dependency of the VM image and the VNFD is removed, the VNFD does not need modification because changing the resource information of the VM image is reflected in the VNFD.

TABLE 3

```
<vdu>
    <metadata>
        <key>#ivls[ 'internal_network' ].ivlId + '_' +
            #networkInterface[ 'internal_network_interface' ].id   +
'_MAC_ADDR' </key>
        <!-- (OGNL) metadata key -->
        <value>#ports[ 'internal_network_interface' ].macAddress</value>
        <!-- (OGNL) metadata value -->
    </metadata>
</vdu>
```

Since the EL has no dependency on a data format such as XML, YAML ain't markup language (YAML), and java script object notation (JSON), the same manner may be applied to the VNFD configured in XML as shown in Table 3 besides OASIS Tosca which is the YAML format, and resource information such as internet protocol (IP) and media access control (MAC) addresses of a port dynamically generated may be expressed.

TABLE 4

```
<vnfcs>
    <vnfc>
        <vnfv_id>VCSCF_VOMA</vnfc_id>
        <name>#vnf.name + '_' + #vnfc.type + #vduNum</name>
        <type>VOMA</type>
        <flavor_name>#vnfPackage.vnfName + '_' + #vnfc.type + '_' +
#vnfPackage.vnfId</flavor_name>
    </vnfv>
</vnfcs>
```

Referring to Table 4, it may be identified that the EL is applied to 'name' and 'flavor_name' described in the VNFD. In this case, 'name' may indicate a name of the VNFC. That is, by applying the EL, since the dependency of the name and the VNFD is removed, the VNFD does not need modification because changing the name is reflected in the VNFD.

TABLE 5

```
<config_params>
    <config_param>
        <param_id>S_VLAN</param_id>
        <value>#ivls[ 'internal_network' ].segmentationId</value>
        <type>String</type>
    </config_param>
    <config_param>
        <param_id>B_VLA</param_id>
        <value>#ivls[ 'bvlan' ].segmentationId</value>
        <type>String</type>
```

TABLE 5-continued

```
    <description>IVL-DATA-internal VLAN ID hex string</description>
  </config_param>
<config_params>
```

Referring to Table 5, it may be identified that the EL is applied to 'value' of the network described in VNFD. That is, by applying the EL, since dependency of the VNF resource information identified only at runtime and the VNFD is removed, the VNFD does not need modification because changing the network is reflected in the VNFD. That is, by applying the EL to 'value' of the network of the VNFD, the dependency between the VNFD and the NFVI may be eliminated.

TABLE 6

```
<network_interface>
    <id>internal_network_interface</id>
    <name>#vnf.name + '_' + #networkInterface.vnfcType + '_' +
#ivl.ivlId + '_' + #ip</name>
    <description> Connection between VOMA and other VMs </description>
    <ivl_id_ref>internal_network</ivl_id_ref>
    <properties>
        <property>
            <id>ip_policy</id>
<value>#inputed_ips[ 'VOMA' ][ 'internal_network_interface' ]</value>
        </property>
        <property>
            <id>mac_policy</id>
            <value>12:00:00:00:14:40</value>
        </property>
    </properties>
</network interface>
```

Referring to Table 6, it may be identified that the EL is applied to 'name' and 'value' of the port described in the VNFD. In other words, by applying the EL, since dependency of the port and the VNFD is removed, the VNFD does not need modification because changing the port is reflected in the VNFD. That is, for the port changed according to NFVI, the VNFD may be configured dynamically by interworking the NFVO 141 and the EL expression.

Figure 7:
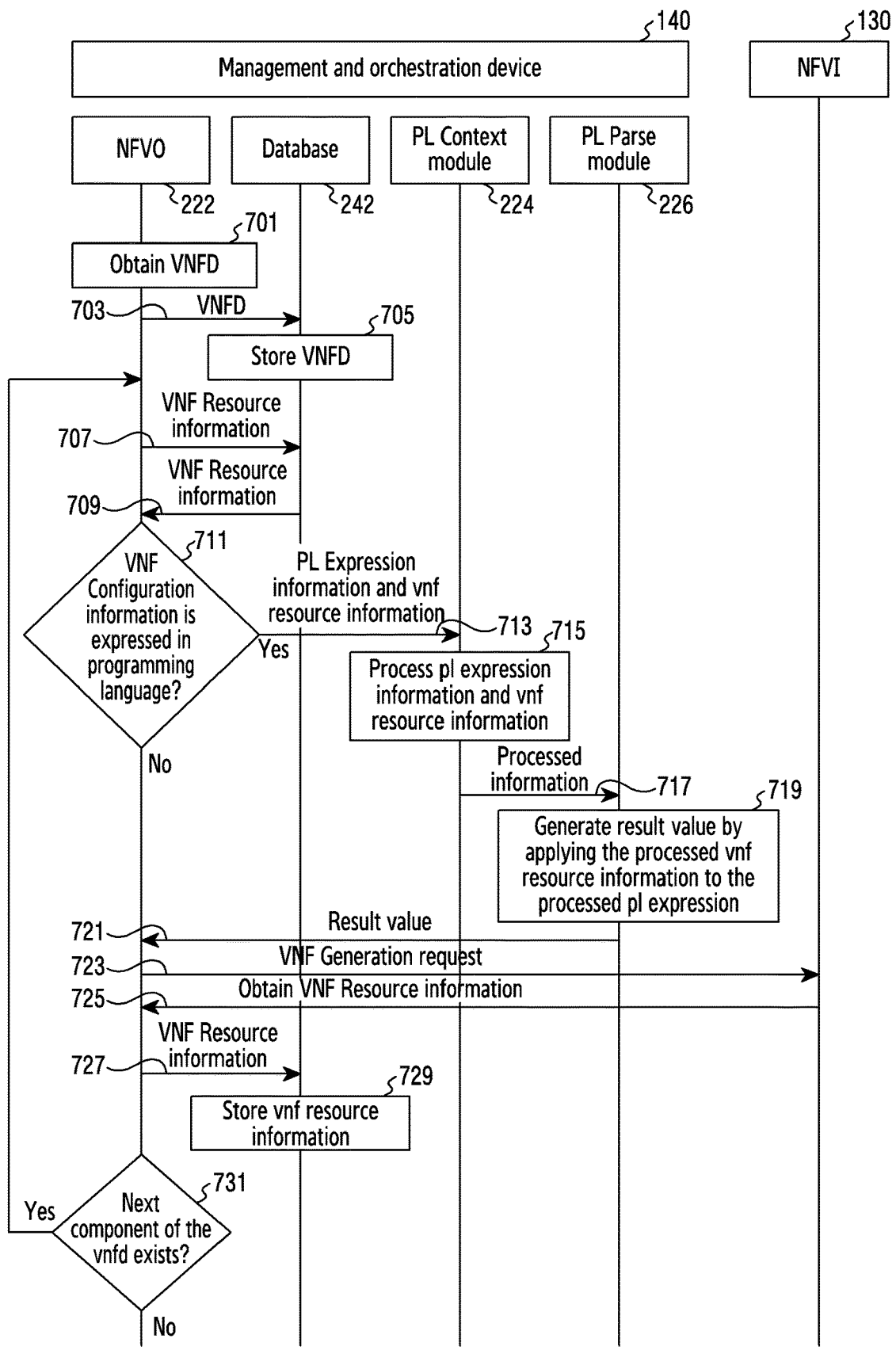
FIG. 7 illustrates signal exchanges for deploying a VNF in a wireless communication system according to various embodiments of the present disclosure.

FIG. 7 illustrates signal exchanges for deploying a VNF in a wireless communication system according to various embodiments of the present disclosure. FIG. 7 illustrates the signal exchanges between the NFV management and orchestration device 140 and the NFVI 130.

Referring to FIG. 7, in step 701, the NFVO 222 obtains a VNFD. In some embodiments, the NFVO 222 may obtain the VNFD through a user's input to a graphical user interface (GUI) of the NFVO 222, to deploy the VNF for elements dependent on the NFVI environment for each site. That is, the VNFD may be dynamically configured by the user's input to the GUI.

In step 703, the NFVO 222 transfers the VNFD to the database 242. In step 705, the database 242 stores the VNFD. In step 707, the NFVO 222 requests VNF resource information from the database 242. In step 709, the database 242 transfers the VNF resource information to the NFVO 222. That is, the NFVO 222 may obtain the VNF resource information.

In step 711, the NFVO 222 determines whether the VNF configuration information for one component of the VNFD is expressed in a programming language. If the VNF configuration information is expressed in the programming language, the NFVO 222 transfers to the PL context module 224 PL expression information of the VNF configuration information and the VNF resource information, in step 713.

In step 715, the PL context module 224 processes the PL expression information and the VNF resource information. In some embodiments, the PL context module 224 may change the VNF resource information and the PL expression of a list form (e.g., #ports.{?#this.name=='control_network'}.address) to VNF resource information and PL expression of a dictionary form (e.g., #ports['control_network'].address). That is, since the VNF resource information and the PL expression are changed to the appropriate format, the PL expression may be used in an intuitive and highly readable manner.

In step 717, the PL context module 224 transfers the processed information to the PL parse module 226. Herein, the processed information may include the processed PL expression information and the processed VNF resource information information. In some embodiments, the PL context module 224 may transfer the PL expression information of the dictionary form and the VNF resource information using a name for distinguishing a port resource as a key, without transferring the PL expression information of the list form for the port resource to the PL parse module 226.

In step 719, the PL parse module 226 generate a result value by applying the processed VNF resource information to the processed PL expression. In step 721, the PL parse module 226 transfers the result to the NFVO 222. In step 723, the NFVO 222 transmits to the NFVI 130 a VNF generation request message including information of the result value. In this case, in response to receiving the VNF generation request message, the NFVI 130 may deploy a VNF corresponding to the result value information.

In step 725, the NFVI 130 transmits new VNF resource information to the NFVO 222. That is, the NFVO 222 may obtain the new VNF resource information. Herein, the new VNF resource information may indicate VNF resource information dynamically generated at runtime. In step 727, the NFVO 222 transmits the new VNF resource information to the database 242. In step 729, the database 242 stores the new VNF resource information.

In step 731, the NFVO 222 identifies whether there exists a next component of the VNFD. If there is the next component of the VNFD, the NFVO 222 may proceed to step 707 and request new VNF resource information for the next component of the VNFD from the database 242. That is, the NFVO 222 may reflect the new VFN resource information in the next component of the VNFD. In this case, the NFVO 222 may dynamically configure the VNFD by also using a programming language for the dynamic VFN resource information generated at runtime, and thus eliminate dependencies of the VNFD, the VNF, and the NFVI.

In some embodiments, the operations of FIG. 7 may be performed sequentially, but may not be performed necessarily sequentially. For example, the order of the operations may be changed, and at least two operations may be performed in parallel. Further, in some embodiments, the operations of FIG. 7 may not be necessarily performed all together, and some of the operations may be omitted.

Figure 8:
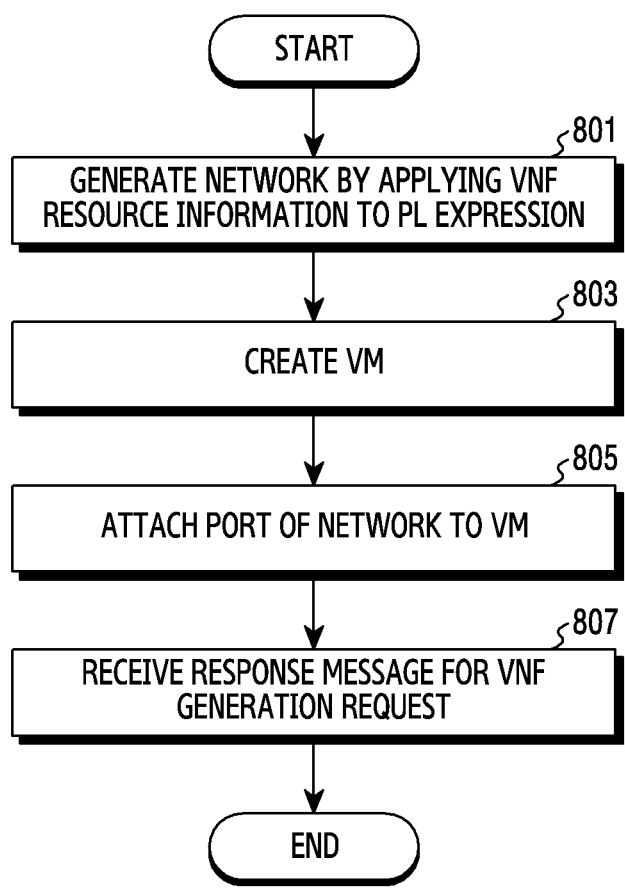
FIG. 8 illustrates yet another flowchart of an NFV management and orchestration device in a wireless communication system according to various embodiments of the present disclosure.

FIG. 8 illustrates yet another flowchart of an NFV management and orchestration device in a wireless communication system according to various embodiments of the present disclosure. FIG. 8 illustrates an operating method of the NFV management and orchestration device 140.

Referring to FIG. 8, in step 801, the NFV management and orchestration device 140 creates a network in the NFVI 130 by applying VNF resource information to a PL expression of VNF configuration information. In some embodiments, the NFV management and orchestration device 140 may transmit to the VIM 143 a request message for creating the network including information of a result value generated by applying the VNF resource information to the PL expression.

In some embodiments, the NFV management and orchestration device 140 may create not only the network, but also a subnet used in the network and a port to use in the VM. In some embodiments, the NFV management and orchestration device 140 may transmit to the VIM 143 a request message for creating at least one of the network, the subnet, and the port. Herein, the subnet may refer to a block of an internet protocol (IP) address. The subnet may be used to assign an IP address if the port is generated on the network. The port may indicate a connection point for attaching to the VM.

In some embodiments, if storage is required in a VNF component (VNFC), the NFV management and orchestration device 140 may additionally generate the storage. In some embodiments, the NFV management and orchestration device 140 may transmit to the VIM 143 a request message for generating the storage. The NFV management and orchestration device 140 may automatically set a size of the storage using a PL expression in consideration of a core and a memory of the VM. In some embodiments, a plurality of VNFCs may configure one VNF.

In step 803, the NFV management and orchestration device 140 generates a VM in the NFVI 130. In some embodiments, the NFV management and orchestration device 140 may transmit a request message for generating the VM to the VIM 143. In some embodiments, the NFV management and orchestration device 140 may transmit to the VM of the NFVI 130 information of a result value generated by applying resource information of at least one of the generated network, subnet, port, and storage to the PL expression. The VM may set a VNF resource using the generated result value information using the result value information.

In step 805, the NFV management and orchestration device 140 attaches the port of the network to the VM. In some embodiments, the NFV management and orchestration device 140 may additionally attach the storage to the VM.

In step 807, the NFV management and orchestration device 140 receives a response message for the VNF generation request from the NFVI 130. That is, the NFV management and orchestration device 140 may identify that the VNFC is generated.

In some embodiments, the operations of FIG. 8 may be performed sequentially, but may not be performed necessarily sequentially. For example, the order of the operations may be changed, and at least two operations may be performed in parallel. Further, in some embodiments, the operations of FIG. 8 may not be necessarily performed all together, and some of the operations may be omitted.

According to various embodiments of the present disclosure, the VNFD to which the programming language is applied may be defined as shown in Table 7 and Table 10.

TABLE 7

```
<?xml version= "1.0" encoding= "utf-8"?>
<vnfd xmlns= "urn:ietf:params:xml:ns:yang:nfvo"
xmlns:xsi= "http://www.w3.org/2001/XMLSchema-instance"
xsi:schemaLocation= "urn:ietf:params:xml:ns:yang:nfvo vnfd-1.xsd">
        <vnfd_id>VNFD-VCSCF-xx-0310</vnfd_id> <!-- VNFD identifier-->
        <name>vCSCF</name> <!-- Full package name among VNFD IDs -->
        <provider>Samsung</provider> <!-- VNF manufacturer -->
        <description>Samsung vCSCF Package 1.0.0</description> <!-- VNF description -->
        <descriptor_version>0.99</descriptor_version> <!-- xml format version -->
        <version>1.0.0</version> <!-- VNF version -->
<vnf_ip_num>2</vnf_ip_num> <!-- Number of IPs input from NFVO UI and delivered to
VNFs (vnfd.vnfcs.vnfc.metadatas.metadata) -->
        <substitution_mappings> <!-- State the relationship of VNF in NS -->
            <requirements> <!-- Specify which VL of NS is connected to the end point of VNF
-->
                <component>
                    <id>virtualLink1</id> <!-id of NS Virtual link -->
                    <type>virtual_link</type> <!-- virtual_link -->
                        <source_id_ref>VOMA-MGMT</source_id_ref> <!-id of VNF end point
(vnfd.connection_points.connection_point.cp_id) -->
                </component>
            </requirements>
            <capabilities> <!-- VNF's end point is in any forwarding path of NS.
Specify whether they are connected -->
                <component>
                    <id>forwarder1</id> <!-id of NS forwarding path -->
                    <type>forwarder</type> <!-- forwarder -->
```

TABLE 7-continued

```
                <source_id_ref>VOMA-MGMT</source_id_ref> <!-id of VNF end point
(vnfd.connection_points.connection_point.cp_id) -->
            </component>
        </capabilities>
    </substitution_mappings>
    <vm_images> <!-- OS Image or Volume Image used by VNF -->
        <vm_image>
            <id>vm_template.img</id> <!-- Image id(vnfd.vnfcs.vnfc.vm_image_id_ref' or
'vnfd.vnfcs.vnfc.storages.external_storages.storage.properties.property.value') 
-->
            <name>vCSCF-VM-IMAGE</name> <!-- Image Name -->
            <filename>vm_template.img</filename> <!-- Image File Name -->
            <version>1.0.0</version> <!-- VM Image Version -->
            <checksum>7ab9267b721e66585599401cfd0addb6</checksum> <!-- (optional)
md5sum value of Image File -->
            <size>#vm_image.size</size> <!-- (optional) Image File Size -->
        </vm_image>
    </vm_images>
    <sw_packages> <!-- SW Package used by VNF -->
        <sw_package>
            <id>SKT_V-IMS_1.0.0_CSCF_TOTAL_SW_DB_VCSCF_V-EPC_VM_150817_112200.tar</id>
<!-- SW Package id(vnfd.vnfcs.vnfc.sw_package_id_ref) -->
            <name>vCSCF-SW-PACKAGE</name> <!-- Image Name -->
            <filename>SKT_V-IMS_1.0.0_CSCF_TOTAL_SW_DB_VCSCF_V-
EPC_VM_150817_112200.tar</filename> <!-- Image File Name -->
            <version>1.0.0</version> <!-- VM Image Version -->
            <checksum>43c9a984ebaa658fa6ad78ad7d6d3f69</checksum> <!-- (optional) Md5sum
of image file -->
            <size>#vm_image.size</size> <!-- (optional) Image File Size -->
        </sw_package>
    </sw_packages>
    <vnfcs>
        <vnfc> <!-- VDU specification and operation method -->
            <vnfc_id>VCSCF_VOMA</vnfc_id> <!-- VNFC id -->
            <name>#vnf.name + '_' + #vnfc.type + #vduNum</name> <!-- (OGNL) VNFC Name
(ex. vCSCF_VOMA1) -->
            <type>VOMA</type> <!-- VNFC Type (VOMA, VIDA. FNMC..) -->
            <flavor_name>#vnfPackage.vnfdName + '-' + #vnfc.type + '-' +
#vnfPackage.vnfdId</flavor_name> <!-- (OGNL) Name used when creating a Flavor in
VIM
-->
            <high_availability>ActiveActive</high_availability> <!-
(ActiveActive/ActviePassive/Unknown) HA setting -->
            <vm_image_id_ref>vm_template.img</vm_image_id_ref> <!-- VM Image
id(vnfd.images.image.id) -->
        <sw_package_id_ref>SKT_V-IMS_1.0.0_CSCF_TOTAL_SW_DB_VCSCF_V-
EPC_VM_150817_112200.tar</sw_package_id_ref> <!-- SW Package
id(vnfd.sw_packages.sw_package.id) -->
            <cpu> <!-- cpu Information -->
                <num_vpu>4</num_vpu> <!-- VCPU as specified in VIM Flavor -->
            </cpu>
            <memory> <!-- memory Information -->
                <total_memory_gb>8</total_memory_gb> <!-- Size of memory to allocate to
VNFC -->
            </memory>
            <storages> <!-- storage information -->
                <local_storages> <!-- Storage for VM Image -->
                    <storage>
                        <storage_id>DISK-001</storage_id> <!-- Local storage id -->
                        <name>#vnf.name + '_' + #storage.type + '_' + #storage.size +
'g'</name> <!-- (OGNL) Storage Name -->
                        <size_gb>@java.lang.Math.ceil((#vm_image.size/(1024*1024))</size_gb>
<!-- (OGNL) VM Image Size -->
                        <properties> <!-- Storage properties -->
                            <property>
                                <id>type</id> <!-- local storage type -->
                                <value>vm_image</value> <!-Type of local storage type -->
                                <description>os-boot-operation-disk</description> <!-- Property
description -->
                            </property>
                        </properties>
                    </storage>
                </local_storages>
                <external_storages> <!-- Storage managed by Cinder -->
                    <storage>
                        <storage_id>DISK-002</storage_id> <!-- Storage id -->
                        <name>#vnf.name + '_' + #storage.type + '_' + #storage.size
```

TABLE 7-continued

```
+ 'g'</name> <!-- (OGNL) Storage Name -->
                        <size_gb>8</size_gb> <!-- Storage Size -->
                        <properties> <!-- Storage properties -->
<property>
                            <id>type</id>
                            <value>ephemeral</value>
                            <description>voma private disk</description>
                        </property>
                        <property>
                            <id>device</id>
                            <value>/dev/vdb</value>
                            <description>volume device name</description>
                        </property>
                    </properties>
                </storage>
            </external_storages>
        </storages>
        <network_interfaces> <!-- VNFC의 Network Interface(port) information -->
            <network_interface>
                <id>internal_network_interface</id> <!-- Network Interface id -->
                <name>#vnf.name + '_' + #networkInterface.vnfcType + '_' + #ivl.ivlId
+ '_' + #ip</name> <!-- (OGNL) Name used when creating a port in VIM -->
                <description> Connection between VOMA and other VMs </description> <!--
Network
Interface Description -->
                <ivl_id_ref>internal_network</ivl_id_ref> <!-- Network Interface
IVL to be connected (id of Internal Virtual Link)
(vnfd.internal_virtual_links.internal_virtual_link.ivl_id)-->
                <properties> <!-- Network Interface properties -->
<property>
                        <id>vendor_private</id>
                        <value>true</value>
                    </property>
                    <property>
                        <id>ip_policy</id>
                        <value>192.168.1.131,192.168.1.195</value>
                    </property>
                    <property>
                        <id>mac_policy</id>
                        <value>12:00:00:00:01:80,12:00:00:00:01:c0</value>
                    </property>
                </properties>
            </network_interface>
        </network_interfaces>
<personalities> <!-- VNFC Personality(file injection) -->
            <personality>
                <path>/vm.conf</path> <!-File Path -->
                <contents>'mgmtipaddr=' +
#ports['control_network_interface'].fixedIps.iterator.next.ipAddress +
'Wnmgmtnetmask=255.255.255.0' + 'Wnmgmtgateway=10.10.10.1' +
'WnNE_TYPE=CSCFWnMST_NTYPE=VOMAWnMTU_SIZE=1700WnUSE_MAPDISK=YESWnUSE_CMSDISK=YES
Wn'</contents>
                <!-- (OGNL) personality File Content -->
            </personality>
        </personalities>
        <metadata' s> <!-- VNFC metadata -->
            <metadata>
                <key>#ivls[ 'internal_network' ].ivlId + '_' + #network
Interfaces[ 'internal_network_interface' ].id + '_MAC_ADDR'</key> <!-- (OGNL)
metadata key -->
                <value>#ports[ 'internal_network_interface' ].macAddress</value> <!--
(OGNL) metadata value -->
            </metadata>
        </metadata' s>
        <extra_specs> <!-- Extra spec of VNFC Flavor generated in VIM -->
            <extra_spec>
                <key>hw:cpu_cores</key>
                <value>8</value>
            </extra_spec>
        </extra_specs>
    </vnfc>
</vnfcs>
<connection_points> <!-- end point of VNF -->
    <connection_point>
        <cp_id>VOMA-MGMT</cp_id> <!-- connection point id -->
        <name>voma-mgmt-point</name> <!-- connection point name -->
        <description>Connection point for VOMA management interfaces</description>
        <vnfc_id_ref>VCSCF_VOMA</vnfc_id_ref> <!-Value of 'vnfd.vnfcs.vnfc.vnfc_id' -
->
```

TABLE 7-continued

```
<network_interface_id_ref>control_network_interface</network_interface_id_ref> <!--
Value of 'vnfd.vnfcs.vnfc.network_interfaces.network_interface.id' -->
            </connection_point>
        </connection_points>
        <internal_virtual_links> <!-- IVL (Internal Virtual Link) included in VNF -->
            <internal_virtual_link>
                <connectivity_type>E-LINE</connectivity_type> <!-- E-LINE | E-LAN -->
                <name>#vnf.name + '_' + #ivl.ivlId</name> <!-- (OGNL) IVL Name -->
                <ivl_id>control_network</ivl_id>
                <properties>
                    <property>
                        <id>physical_network</id>
                        <value>physnet3</value>
                    </property>
                </properties>
            </internal_virtual_link>
        </internal_virtual_links>
        <monitoring_params> <!-- Among the information on VNF performance received from
VNFM in NFVO, items for monitoring based on scale are specified k) -->
            <monitoring_param>
                <param_id>PCSCF_AVG.VECA</param_id> <!-- ITEM.NODE_TYPE (ex. CPU_AVG.VIVA) --
>
                <description>The average of PCSCF session count</description>
            </monitoring_param>
        </monitoring_params>
        <flavors> <!-- VNF의 Flavor(VDU Configuration information) -->
            <flavor>
                <flavor_id>FLAVOR_NORMAL</flavor_id> <!-- Flavor id -->
                <name>FLAVOR_NORMAL</name> <!-- Flavor Name -->
                <description>VCSCF Flavor for 1000000</description>
                <vdus> <!-- VDU configured in VNF Flavor -->
                    <vdu>
                        <vdu_id>UUID-VDU-VOMA</vdu_id> <!-- VDU ID -->
                        <vnfc_id_ref>VCSCF_VOMA</vnfc_id_ref> <!-id of VNFC(vnfd.vnfcs.vnfc.id) -
->
                        <num_instances>2</num_instances>
                        <scale_in_out> <!-- Scale in range -->
                            <min>2</min> <!-- Scale in minimum value -->
                            <max>2</max> <!-- Scale in maximum value -->
                        </scale_in_out>
                    </vdu>
                </vdus>
            </flavor>
        </flavors>
        <vdu_dependencies> <!-- Defining the production sequence of VNFC in VNF -->
            <vdu_dependency>
                <sequence_id>1</sequence_id> <!-- VNFC generation order specified from 1 -->
                <vdu_id_ref>UUID-VDU-VOMA</vdu_id_ref> <!--
vnfd.flavors.flavor.vdus.vdu.vdu_id -->
            </vdu_dependency>
            <vdu_dependency>
                <sequence_id>2</sequence_id>
                <vdu_id_ref>UUID-VDU-VECA</vdu_id_ref>
                <create_after> <!-- (Optional) Created after vdu_id_ref specified below is
created -->
                    <vdu_id_ref>UUID-VDU-VOMA</vdu_id_ref>
                </create_after>
            </vdu_dependency>
        </vdu_dependencies>
        <autoscaling_policies> <!-- VNF auto scale condition -->
            <autoscaling_policy>
                <scaling_policy_id>PID-0001</scaling_policy_id> <!-- auto scale policy id -->
                <name>Scale-Out</name> <!-- auto scale policy name -->
                <severity>Major</severity>
                <target_vdu_id>UUID-VDU-VIVA</target_vdu_id> <!-- VDU to be executed when
auto scale policy condition is satisfied -->
                <expression> <!-- auto scale policy condition -->
                    <subexpression> <!-- When the 'monitoring_param_id_ref' satisfies the
'operator' operator while the 'threshold' value is 'time_range', the auto scale
policy is satisfied and 'execution' is performed.-->
                        <monitoring_param_id_ref>CPU_AVG.VIVA</monitoring_param_id_ref>
                        <operator>greater than</operator> <!-- equal to/not equal to/greater
than/less than/greater than or equal to/less than or equal to/not -->
                        <threshold>50</threshold> <!-- threshold -->
                        <time_range>60</time_range> <!-- Condition hold time (second)-->
                    </subexpression>
                    <cold_time>120</cold_time> <!-- Time not to perform policy check after auto
scale policy is applied (second) -->
                </expression>
                <actions>
```

TABLE 7-continued

```
                <action>
                        <execution>Scale Out</execution> <!-- Action to be performed when the
condition is satisfied -->
                </action>
                <action>
                        <execution>Send TCA</execution>
                </action>
                </actions>
        </autoscaling_policy>
    </autoscaling_policies>
<config_params> <!-- Information transferred from NFVO to VNFM -->
        <config_param>
                <param_id>S_VLAN</param_id> <!-- config param id -->
                <value>#ivls['internal_network'].segmentationId</value> <!-- (OGNL) config
param value -->
                <type>String</type> <!-- type(String/Integer/Long/Boolean) -->
                <description>IVL-CONTROL-internal VLAN ID hex string</description>
        </config_param>
    </config_params>
    <lifecycle_notifications> <!-- Specify how to handle lifecycle received from VNFM
in NFVO -->
<lifecycle_notification status= "running" name= "vnf.instance.instantiate.start"
display_name= "VNF INSTANTIATE START" description= "">
                <actions>
                        <action name= "send_vnf" />
                        <action name= "update_vnf" />
                </actions>
        </lifecycle_notification>
    </lifecycle_notifications>
    <fault_notifications> <!-- NFVO specifies how to handle faults received from VNFM
-->
        <fault_notification name= "VNF CONNECTION ALARM" display_name= "VNFM-VNF
Connection Down" node_type= "VNFM_VNF" description= "">
                <actions>
                        <action name= "send_alarm" />
                </actions>
        </fault_notification>
    </fault_notifications>
</vnfd>
```

Table 7 defines the VNFD expressed in XML in ETSI IFA011, and it may be identified that the EL is applied to image file size, VNFC name, flavor name, storage name, port name, contents of personality file, size of VM image, metadata of port, network name, and config_param values. Accordingly, even if the resource information is changed, the VNFD does not need modification because the change is reflected in the VNFD.

In some embodiments, the NFV management and orchestration device 140 may generate the network by applying the PL expression to the resource information of the network. For example, in Table 7, the name of "internal_virtual_link" as the resource information of the network may be expressed as "<name>#vnf.name+'_'+#ivl.ivlId" by applying the PL expression.

In other embodiments, the NFV management and orchestration device 140 may generate a port by applying the PL expression to the resource information of the port. For example, in Table 7, the PL expression for the port may be expressed as "<key>#ivls['internal_network'].ivlId+'_'+#networkInterfaces['internal_network_interface'].id+'_MAC_ADDR'</key>" and "<value>#ports['internal_network_interface'].macAddress</value>". Herein, the value of <key> is information for indicating which port the corresponding port is, and the value of <value> may include information for indicating a MAC address of the corresponding port.

The NFV management and orchestration device 140 may process the resource information and the PL expression for the port. For example, the processed resource information and the processed PL expression for the port may be expressed in the dictionary form, and may be defined as shown in Table 8.

TABLE 8

```
Map<String,    VnfcNetworkInterfaceInfo>    vnfcNetworkMap    =
vnfcNetworkInterfaces ==
null ? null :
vnfcNetworkInterfaces.stream( ).collect(Collectors.toMap(VnfcNetworkInterf
aceInfo
::getId, v -> v));
Map<String, Object> root = Maps.newHashMap( );
root.put("vnfm", vnfm);
root.put("vnf", vnf);
root.put("vnfc", vnfc);
root.put("ivls", networks);
root.put("networkInterfaces", vnfcNetworkMap);
root.put("ports", ports);
root.put("vduNum", vduNum);
```

TABLE 8-continued

```
root.put("emsIp", emsIp);
root.put("vips", toVirtualIpMap(vips));
root.put("vnfIps", vips == null ? Arrays.asList( ) : vips.stream( ).map(x
-> x.getVirtualIp( )).collect(Collectors.toList( )));
```

The NFV management and orchestration device 140 may generate a result value by applying the processed resource information of the port to the processed PL expression. For example, the generated result value may be defined as shown in Table 9.

TABLE 9

```
<metadata>
<key>control_network_internal_network_interface_MAC_ADDR</key>       <!--
control_network      #ivls[ 'internal_network' ].ivlId,
internal_network_interface
#networkInterfaces[ 'internal_network_interface' ].id -->
<key>fe80::d920:5a78:b091:4c2</key> <!-- Value generated at runtime. In
this case, even if a change such as an additional port is generated, if
the key value is expressed in EL, the change can be reflected in the VNFD.
-->
</metadata>
```

TABLE 10

```
tosca_definitions_version: tosca_simple_profile_for_nfv_1_0
metadata:
    id: VNFD-VCSCF-100-1014 # VNFD Indentifier
name: vCSCF # V Full package name among VNFD IDs
provider: Samsung # VNF manufacturer
    description: Samsung vCSCF Package 1.0.0 # VNF description
    descriptor_version: 0.99 # format version
    version: 1.0.0 # VNF version
    vnf_connection_id: VNFMR # ID used to access 4G TL1 VNF from VNFM
    vnf_ip_num: 2 # Number of IPs input from NFVO UI and delivered to VNFs
(vnfd.vnfcs.vnfc.metadatas.metadata)
topology_template:
    inputs:
    subsititution_mappings: # State the relationship of VNF in NS
        requirements: # Specify which VL end point of VNF is connected to NS
            - id: virtualLink1 # NS Virtual link id
              type: virtual_link # virtual_link
              source_id_ref: VOMA-MGMT       # id of VNF end point
(vnfd.connection_points.connection_point.cp_id)
        capabilities: # Specify which forwarding path of VNF is connected to
the end point of VNF
            - id: forwarder1 # id of NS forwarding path
              type: forwarder # forwarder
              source_id_ref: VOMA-MGMT       # id of VNF end point
(vnfd.connection_points.connection_point.cp_id)
        node_templates:
##########################################################################
# VOMA
##########################################################################
        VCSCF_VOMA: # VNFC id
            type: tosca.nodes.nfv.VDU.Compute # tosca predefined node type
            properties:
                name: "#vnf.name + '_' + #vnfc.type + #vduNum" # (OGNL) VNFC
Name (ex. vCSCF_VOMA1)
                description: VOMA Description
                # not spec
                type_of_vdu: VOMA # VDU Type (VOMA, VIDA. FNMC..)
                # not spec
                flavor_name: "#vnfPackage.vnfdName + '-' + #vnfc.type + '-' +
#vnfPackage.vnfdId" # (OGNL) Name used when creating a Flavor in VIM
                # not spec
                high_availability:    ActivePassive        #
(ActiveActive/ActviePassive/Unknown) HA setting
                # not spec
                personalities: # VNFC Personality
                    - path: /vm.conf # File Path
                      contents:        "'mgmtipaddr='       +
#ports['control_network_interface'].fixedIps.iterator.next.ipAddress +
```

TABLE 10-continued

```
'Wnmgmtnetmask=255.255.255.0' + 'Wnmgmtgateway=10.10.10.1' +
'WnNE_TYPE=CSCFWnMST_NTYPE=VOMAWnMTU_SIZE=1700WnUSE_MAPDISK=YESWnUSE_CMSD
ISK=YESWn'"
                            # (OGNL) personality File Content
            # not spec
            metadatas: # VNFC metadata
                - key: VNFM_IP_ADDR # (OGNL) metadata key
                  value: "#vnfm.ip" # (OGNL) metadata value
                - key: "#ivls['internal_network'].ivlId + '_' +
#networkInterfaces['internal_network_interface'].id + '_MAC_ADDR'"
                  value: "#ports['internal_network_interface'].macAddress"
            # not spec
            extra_specs: # Extra spec of VNFC Flavor generated in VIM
                - key: hw:cpu_cores
                  value: 8
                - key: hw:cpu_sockets
                  value: 1
                - key: hw:cpu_threads
                  value: 1
                - key: hw:mem_page_size
                  value: 1GB
        capabilities:
            virtual_compute:
                properties:
                    virtual_cpu: # VCPU stated in VIM Flavor
                        properties:
                            num_virtual_cpu: 8
                    virtual_memory: # Memory size to allocate to VNFC
                        properties:
                            virtual_mem_size: 24096 MB
        artifacts:
            - sw_image: # OS Image or Volume Image used by VNF
              type: tosca.artifacts.nfv.SwImage # tosca predefined node type
              properties:
                  id:     vm_template.img     #     Image
id(vnfd.vnfcs.vnfc.vm_image_id_ref'  or
'vnfd.vnfcs.vnfc.storages.external_storages.storage.properties.property.v
alue')
                  name: vCSCF-VM-IMAGE # Image Name
                  version: 1.0.0 # VM Image Version
                  checksum: 7ab9267b721e66585599401cfd0addb6 # Md5sum value in
image file
                  size: #vm_image.size # Image File Size
                  sw_image: vm_template.img # Image File Name
            #   not spec
            - sw_package: # SW Package used by VNF
              type: tosca.Samsung.artifacts.nfv.SwPackage # tosca predefined
node type
              properties:
                  id:     SKT_V-IMS-1.0.0_CSCF_TOTAL_SW_DB_VCSCF_V-
EPC_VM_150817_112200.tar       #      SW       Package
id(vnfd.vnfcs,vnfc.sw_package_id_ref)
                  name: vCSCF-SW-PACKAGE # Image Name
                  version: 1.0.0 # VM Image Version
                  checksum: 43c9a984ebaa658fa6ad78ad7d6d3f69 # Md5sum value in
image file
                  size: #vm_image.size # Image File Size
                  sw_image:      SKT_V-IMS_1.0.0_CSCF_TOTAL_SW_DB_VCSCF_V-
EPC_VM_150817_112200.tar # Image File Name
        requirements:
            virtual-storage: [VOMA_VM_IMAGE, VOMA_PRIVATE_STORAGE] # Storage
information required by VM
            virtual_link: VOMA_INTERNAL_NI # Network information required by
VM
    VOMA_VM_IMAGE: # Storage (local storage) for VM Image
        type: tosca.nodes.nfv.VDU.VirtualStorage # tosca predefined node
type
        properties:
            id: DISK-001 # Local storage id
            # not spec
            name: "#vnf.name + '_' + #storage.type + '_' + #storage.size +
'g'" # (OGNL) Storage Name
            # not spec
            type: vm_image # local storage type
            type_description: os-boot-operation-disk # type description
            size_of_storage:
"@java.lang.Math.ceil((#vm_image.size/(1024*1024))" # (OGNL) VM Image
Size
```

TABLE 10-continued

```
            VOMA_PRIVATE_STORAGE: # Storage managed by Cinder
                type: tosca.nodes.nfv.VDU.VirtualStorage # tosca predefined node
type
                properties:
                    id: DISK-002 # Storage id
                    # not spec
                    name: "#vnf.name + '_' + #storage.type + '_' + #storage.size + 'g'"
# (OGNL) Storage Name
                    # not spec
                    type: ephemeral # storage type
                    type_description: voma ephemeral disk # type description
                    size_of_storage: 8 # Storage Size
                    # not spec
                    device: /dev/vdb
                    device_description: volume device name
            VOMA_INTERNAL_NI: # VNFC Network Interface(port) information
                type: tosca.nodes.nfv.Cpd # tosca predefined node type
                properties:
                    # not spec
                    network_interface_id: internal_network_interface        # Network
Interface id
                    # not spec
                    name: "#vnf.name + '_' + #net workInterface.vnfcType + '_' +
#ivl.ivlId + '_' + #ip" # (OGNL) Name used when creating a port in VIM
                    layer_protocol: ipv4 # Layer protocol
                    description: Connection between VOMA and other VMs
                    address_data:
                    -   address_type: ip_address
                        l3_address_data:
                        ip_address_assignment: false
                        # not spec
                        ip_policy: 192.168.1.131,192.168.1.195
                    -   address_type: mac_address
                        l2_address_data:
                        ip_address_assignment: false
                        # not spec
                        mac_policy: 12:00:00:00:01:80,12:00:00:00:01:c0
                requirements:
                    -   virtual_bindable: VCSCF_VOMA
                    -   virtual_linkable: internal_network
###################################################################
# Virtual Link
###################################################################
            internal_network: # IVL (Internal Virtual Link) included in VNF
                type: tosca.nodes.nfv.VnfVirtualLinkDesc # tosca predefined node
type
                properties:
                    connectivity_type:
                        # ethernet, mpls, odu2, ipv4, ipv6, pseudo_wire
                        layer_protocol: ipv4
                    description: internal_network
                    name: "#vnf.name + '_' + #ivl.ivlId" # (OGNL) IVL Name
                    physical_network: physnet1
                    network_type: vlan
                    segmentation_id: 123
                    enable_dhcp: false
                    cidr: 192.168.0.0/16
            VCSCF-FLAVOR-100: # Flavor id
                type: tosca.nodes.nfv.VnfDf # tosca predefined node type
                properties:
                    name: VCSCF_FLAVOR_100 # Flavor Name
                    description: VCSCF Flavor for 1000000
                    supported_operation: # supported operation
                        - instantiation
                        - termination
                        - clear
                        - scale
                        - edit_policy
                    vdu_profile:
                        -   vdu_id: VCSCF_VOMA # VDU ID
                            min_number_of_instances: 2 # Scale in minimum value
                            max_number_of_instances: 2 # Scale in maximum value
# Monitoring parameter, specifying information for monitoring based on
scale among VNF performance information received from VNFM in NFVO
            PCSCF_AVG.VECA: # ITEM.NODE_TYPE (ex. CPU.AVG.VIVA)
                type: tosca.nodes.nfv.MonitoringParameter # tosca predefined node
type
                properties:
                    description: The average of PCSCF session count
# Auto Scale policy
```

TABLE 10-continued

```
            PID-0006: # auto scale policy id
                    type: tosca.Samsung.nodes.nfv.AutoScalingPolicy # tosca predefined
node type
                    properties:
                            name: Scale-In # auto scale policy name
                            severity: Major
                            vdu_id: VCSCF_VECA # VDU to be executed when auto scale policy
condition is satisfied
                            expression:
                                    cold_time: 120 # Time not to perform policy check after auto
scale policy is applied (second)
                                    # optional: and, or
                                    operator: and
                                    subexpression:
                                            - monitoring_param_id_ref: PCSCF_AVG.VECA #
                                              operator: less than # equal to/not equal to/greater
than/less than/greater than or equal to/less than or equal to/not
                                              threshold: 20 # threshold
                                              time_range: 60 # Condition hold time (second)
                            action:
                                    - execution: Scale In # Action to be performed when the condition
is satisfied
# end point
        VOMA-MGMT: # end point id
                type: tosca.Samsung.nodes.nfv.ConnectionPoint # tosca predefined
node type
                properties:
                        name: voma-mgmt-point # end point name
                        description: Connection point for VOMA management interfaces
                requirements:
                        vdu: VCSCF_VOMA # vdu id, 'vnfd.vnfcs.vnfc.vnfc_id'의 값
                        virtual_link: VOMA_INTERNAL_NI       # virtual link, value of
'vnfd.vnfcs.vnfc.network_interfaces.network_interface.id'
        LIFECYCLE_NOTIFICATION: # lifecycle event definition
                type: tosca.Samsung.nodes.nfv.LifecycleNotification      # tosca
predefined node type
                properties:
                        lifecycle_notification:
                                - name: vnf.instance.instantiate.start
                                  status: running
                                  display_name: VNF INSTANTIATE START
                                  description:
                                  action:
                                        - name: send_vnf
                                        - name: update_vnf
        FAULT_NOTIFICATION: # NFVO specifies how to handle faults received from
VNFM     type: tosca.Samsung.nodes.nfv.FaultNotification # tosca
predefined node type
                properties:
                        fault_notification:
                                - name: VNF CONNECTION ALARM
                                  display_name: VNFM-VNF Connection Down
                                  node_type: VNFM_VNF
                                  description:
                                  action:
                                        - name: send_alarm
# Config Param
        S_VLAN: # config param id
                type: tosca.Samsung.nodes.nfv.ConfigParam # tosca predefined node
type
                properties:
                        value: "#ivls['internal_network'].segmentationId" # (OGNL) config
param value
                        type: String # type(String/Integer/Long/Boolean)
                        description: IVL-CONTROL-internal VLAN ID hex string
```

Table 10 defines the VNFD in OASIS Tosca NFV, and it may be identified that the EL is applied to VNFC name, flavor name, contents of personality file, metadata, image file size, storage name, size of VM image, port name, IVL name, and config_param values. Accordingly, even if the resource information is changed, the VNFD does not need modification because the change is reflected in the VNFD.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the disclosure. Thus, the scope of the disclosure is not limited and defined by the described embodiment and is defined not only the scope of the claims as below but also their equivalents.

The invention claimed is:

1. An operating method performed by a device for network function virtualization (NFV) in a communication system, comprising:
obtaining a virtual network function descriptor (VNFD) expressed by a programming language;
identifying a virtual network function (VNF) configuration information expressed in the programming language, the VNF configuration information being included in the VNFD, wherein a programming language expression includes a combination of character strings for indicating a property of VNF resource information and an operator for concatenating the character strings;
determining the VW resource information based on the VNF configuration information expressed in the programming language, wherein the determining of the VNF resource information comprises generating a result value, via an NFV management and orchestration device, by applying the VNF resource information to the programming language expression of the VNF configuration information;
transmitting a VNF generation request message comprising the result value, the result value indicating the property of the VNF resource information; and
reflecting the determined VNF resource information in the VNFD and the determined VNF resource information is expressed by the programming language,
wherein the property of the VNF resource information includes a name, a type, and a size of the VNF resource information, and
wherein in response to the programming language being applied to the VNFD in an NFV environment, dependencies between the VNFD and an NFV infrastructure (NFVI) and the VNF is eliminated.

2. The method of claim 1, further comprising: receiving the VNF resource information from the NFVI.

3. The method of claim 1, wherein the VNF is deployed in the NFVI receiving the VNF generation request message.

4. The method of claim 1, wherein the VNFD comprising the VNF configuration information is used to deploy a plurality of VNFs.

5. An apparatus for network function virtualization (NFV) in a communication system, comprising:
a transceiver; and
at least one processor functionally coupled with the transceiver, wherein the at least one processor controls to:
obtain a virtual network function descriptor (VNFD) expressed by a programming language,
identify a virtual network function (VNF) configuration information expressed in the programming language, the VNF configuration information being included in the VNFD, wherein a programming language expression includes a combination of character strings for indicating a property of VNF resource information and an operator for concatenating the character strings,
determine the VNF resource information based on the VNF configuration information expressed in the programming language wherein the determining of the VNF resource information comprises a result value, via an NFV management and orchestration device, by applying the VNF resource information to the programming language expression of the VNF configuration information,
transmit a VNF generation request message comprising the VNF resource information, and
reflect the determined VNF resource information in the VNFD and the determined VNF resource information is expressed by the programming language,
wherein the property of the VNF resource information includes a name, a type, and a size of the VNF resource information, and wherein in response to the programming language being applied to the VNFD in an NFV environment, dependencies between the VNFD and an NFV infrastructure (NFVI) and the VNF is eliminated.

6. The apparatus of claim 5, wherein the at least one processor further controls to receive the VNF resource information from the NFVI.

7. The apparatus of claim 5, wherein the at least one processor further controls to change the programming language expression from a list form to a dictionary form.

8. The apparatus of claim 6, wherein the at least one processor further controls to generate a network in the NFVI by applying the VNF resource information to a programming language expression of the VNF configuration information.

9. The apparatus of claim 8, wherein the at least one processor further controls to:
create a virtual machine (VM) of the NFVI, and attach a port of the network to the VM.

10. The apparatus of claim 6, wherein the VNF resource information comprises at least one of network information, subnet information, port information, storage information, and VM information.

11. The apparatus of claim 5, wherein the VNFD comprising the VNF configuration information is used to deploy a plurality of VNFs.

12. The apparatus of claim 5, wherein the VNF is deployed in the NFVI receiving the VNF generation request message.

13. The method of claim 2, further comprising: generating a network in the NFVI by applying the VNF resource information to a programming language expression of the VNF configuration information.

14. The method of claim 13, further comprising:
creating a virtual machine (VM) of the NFVI; and
attaching a port of the network to the VM.

15. The method of claim 2, wherein the VNF resource information includes at least one of network information, subnet information, port information, storage information, and virtual machine (VM) information.

16. The method of claim 1, wherein deployment and operation of the VNF is automated based on the programming language being applied to the VNFD.

* * * * *